United States Patent [19]
Wright

[11] Patent Number: 5,839,713
[45] Date of Patent: Nov. 24, 1998

[54] SUPPORT FOR ENTERTAINMENT EQUIPMENT

[76] Inventor: Carroll Wright, 3605 Chamberlain, SE., Grand Rapids, Mich. 49508

[21] Appl. No.: 985,459

[22] Filed: Dec. 5, 1997

[51] Int. Cl.[6] .................................................. A47B 91/00
[52] U.S. Cl. .............................. 248/346.01; 248/346.03; 297/188.14; 297/188.18
[58] Field of Search .................. 248/346.07, 346.03, 248/346.01, 346.06, 499, 500, 503.1, 917, 924, 309.1, 314, 183.1, 205.2, 229.22, 229.12; 297/188.14, 188.18, 188.2, 217.1, 217.3, 217.6, 170, 172, 140, 145

[56] References Cited

U.S. PATENT DOCUMENTS

| | | | |
|---|---|---|---|
| 1,285,146 | 11/1918 | Harris | 292/153 |
| 1,742,822 | 1/1930 | Olson | 297/255 |
| 2,669,495 | 2/1954 | Foote | 311/17 |
| 3,063,064 | 11/1962 | Mace | 5/74 |
| 3,338,629 | 8/1967 | Drees | 312/235.8 |
| 3,488,089 | 1/1970 | Brennan | 297/162 |
| 3,583,760 | 6/1971 | McGregor | 297/145 |
| 3,752,376 | 8/1973 | Shelton et al. | 224/42.45 B |
| 3,934,771 | 1/1976 | Eberhard | 224/42.42 A |
| 4,146,159 | 3/1979 | Hemmen | 224/275 |
| 4,585,196 | 4/1986 | Cormier | 248/214 |
| 4,668,010 | 5/1987 | Fujiwara | 297/150 |
| 4,795,210 | 1/1989 | Milat | 297/194 |
| 4,946,120 | 8/1990 | Hatcher | 248/183 |
| 5,000,511 | 3/1991 | Shichijo et al. | 297/191 |
| 5,076,641 | 12/1991 | Lindberg | 297/194 |
| 5,085,153 | 2/1992 | McKee | 108/44 |
| 5,195,709 | 3/1993 | Yasushi | 248/280.1 |
| 5,316,369 | 5/1994 | Kanda | 297/194 |
| 5,397,160 | 3/1995 | Landry | 296/37.8 |
| 5,516,191 | 5/1996 | McKee | 297/188.15 |
| 5,667,272 | 9/1997 | Sutton | 297/140 |

*Primary Examiner*—Leslie A. Braun
*Assistant Examiner*—Tan Le
*Attorney, Agent, or Firm*—Van Dyke, Gardner, Linn & Burkhart, LLP

[57] ABSTRACT

A support for entertainment equipment includes a base member having a support surface for supporting the entertainment equipment thereon, the base member including an adjustable restraint for at least vertically coupling the base member to a fixed member, for example the arm rests of a pair of vehicle seats, a lateral restraint for restraining the lateral movement of the base member along the longitudinal extent of the fixed member, and a moment restraint for restraining the base member from overturning on the fixed member. The support also includes at least one restraining device for securing the entertainment equipment to the base member. Preferably the base includes outwardly projecting flanges, which provide several functions. In addition to providing an extended bearing contact with the arm rests to laterally restrain the base on the arm rests, the flanges also provide arm rests. Moreover, the flanges preferably include wedge members which bear against the seat back of the vehicle seat to provide a moment restraint for the support. Although made of light construction and portable, the support of the present invention provides a secure and rigid mount for the entertainment equipment.

20 Claims, 4 Drawing Sheets

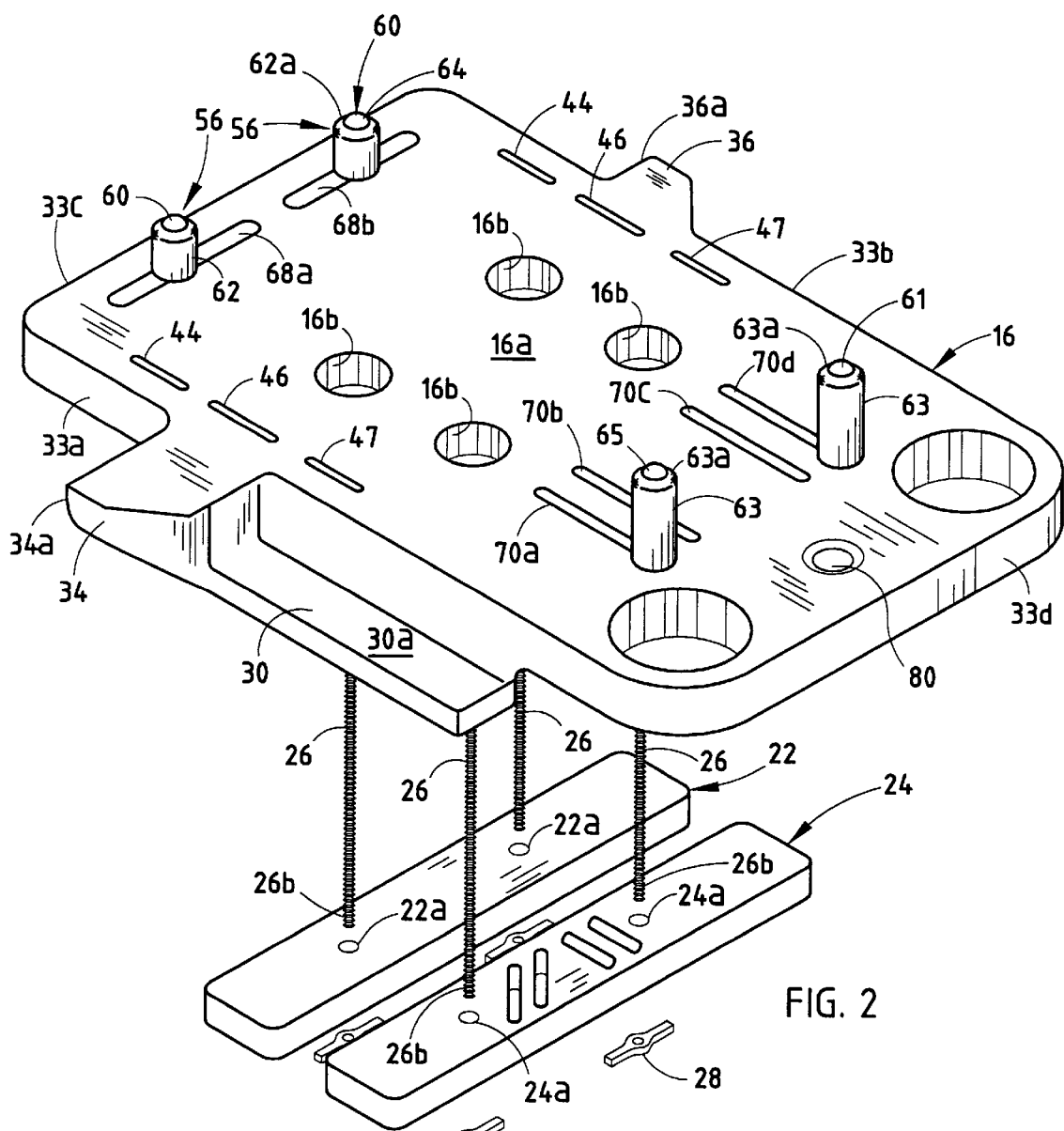
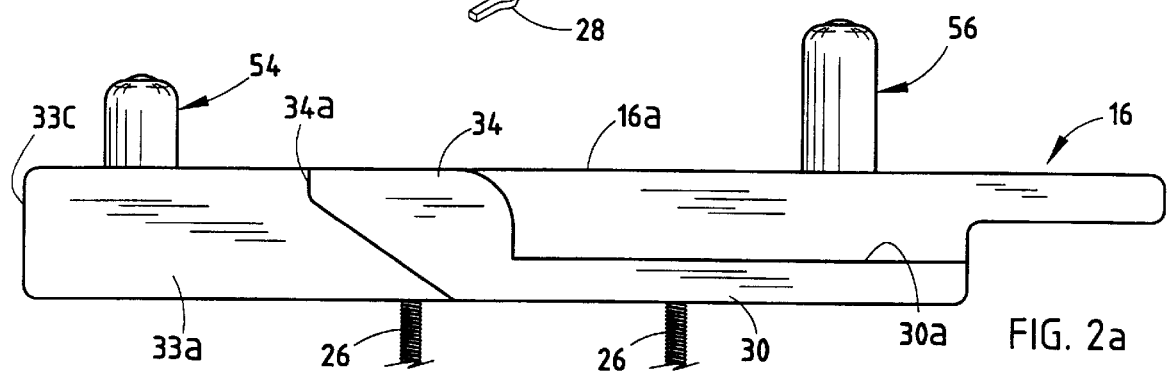
FIG. 2
FIG. 2a

SUPPORT FOR ENTERTAINMENT EQUIPMENT

TECHNICAL FIELD AND BACKGROUND OF THE INVENTION

The present invention relates to a support for mounting entertainment equipment within a vehicle and, more particularly to a support which mounts entertainment equipment to the arm rests of adjacent seats in a vehicle so that the entertainment equipment can be viewed by an occupant or occupants seated in the rear of the vehicle.

To make traveling in vehicles more enjoyable, drivers often bring a TV or TV-VCR or other entertainment equipment along in the vehicle so that the occupants of the vehicle, other than the driver, can be entertained by movies, music, etc. This is most common in conversion vans which often include elaborate permanently mounted support structures for securing TVS, VCRs, and the like to the frame of the vehicle so that the occupants in the rear of the vehicle can view the TV or VCR for entertainment. In some cases, vehicle owners do not want to allocate such a large space, which is required by the permanently mounted support, and would prefer a support which is removable and one which can be stored for retrieval later so as not to draw attention to the vehicle to potential thieves. In other cases, the owner has purchased the vehicle without the support for economy sake or has purchased a used vehicle which was not factory installed with a support. In either case, later installation of such support structures is often cost prohibitive. Furthermore, some vehicle are too small to accommodate these permanently mounted supports.

Consequently, there is a need for a support which is adapted to support electronic equipment, for example a TV or TV-VCR, in a vehicle and in other modes of transportation, such as boat, and which is easy to install and yet occupies minimal space. Furthermore, the support should be easy to handle and yet should provide a secure mounting of such equipment in the vehicle.

SUMMARY OF THE INVENTION

Accordingly, the present invention provides a new and unique support for entertainment equipment, which is especially suited for mounting the entertainment equipment to the arm rests of a pair of vehicle seats. The support is adjustable to accommodate various sizes of equipment and also is removable and portable for easy storage.

According to one aspect of the invention, a support includes a base member and at least one restraining device for securing the entertainment equipment to the base member. The base member includes a support surface for supporting the entertainment equipment thereon and an adjustable restraint for at least vertically coupling the base member to a fixed member, for example an arm rest. The base member further includes a lateral restraint for restraining the lateral movement of the base member along the longitudinal extent of the fixed member and a moment restraint for restraining the base member from overturning on the fixed member.

In one form the adjustable restraint includes a transverse member for extending under the longitudinal extent of the fixed member and at least one connecting member adjustably and releasably securing the transverse member to the base member. For example, the connecting member may comprise a threaded rod and a nut, which is threadingly engaged with the threaded rod. Preferably, the lateral restraint includes means for clamping the transverse member onto the fixed member whereby the frictional forces between the base member and the fixed member and between the transverse member and the fixed member have sufficient magnitude to provide the lateral restraint.

In other forms, the moment restraint comprises a pair of flanges which extend outwardly from opposed sides of the base member and are positioned for engaging the vertical extent of the fixed member. Preferably, each of the flanges includes a wedge member for abutting the vertical extent of the fixed member to provide a lateral restraint of the base member along the longitudinal extent of the fixed member and a moment restraint for restraining the base member from overturning on the fixed member.

In yet another form, the restraining device comprises a strap, which is coupled to the base member and secures entertainment equipment to the base member.

According to another aspect of the invention, a support for securing entertainment equipment to a pair of arm rests of adjacent seats includes a base member and a pair of projecting members extending from opposed sides of the base member for positioning on a generally horizontal support surface of the arm rests. The projecting members abut vertical abutment surfaces of the adjacent seats to restrain lateral movement of the base member with respect to the arm rests and restrain the base member from overturning on the arm rests. The support also includes a transverse member which is releasably and adjustably secured to the base member and which extends under the generally horizontal support surface of the arm rests for restraining vertical movement of the base member with respect to the arm rests. At least one restraining device cooperates with the base member for securing the entertainment equipment to the base member.

In one form, the base member includes a plurality of adjustable stops for laterally restraining the entertainment equipment on the base member. Each of the adjustable stops includes a bumper which is releasably and adjustably secured to the base member. In this manner, the stops can be repositioned on the base member to accommodate entertainment equipment having varying dimensions. Preferably, the base member includes a plurality of slotted openings, with each of the bumpers being secured to the base members by a fastener that extends through respective slotted openings to permit adjustment of the bumpers on the base member.

In another form, the adjustable restraint comprises first and second straps which extend through first and second openings, respectively, provided in the base member. The first opening includes a sloping bearing surface whereby the first strap maintains full contact with the base member even when the first strap is skewed with respect to the support surface, for example when the strap is securing equipment to the base which has a sloped housing.

In yet another form, the base may include at least one opening which is configured for holding a cup or a container.

Accordingly, a support is provided which can be adjusted to accommodate various sizes of equipment and can be adjusted to suit various arm rest arrangements. Furthermore, the support includes restraints that restrain all degrees of freedom of the support on the arm rest and, therefore, provide a rigid and secure mounting for the entertainment equipment in a vehicle without occupying a large portion of the available space in the vehicle.

These and other objects, advantages, purposes and features of the invention will become more apparent from a study of the following description taken in conjunction with the drawings.

DESCRIPTION OF THE DRAWINGS

FIG. 2 is an exploded perspective view of the support of FIG. 1;

FIG. 2a is a side elevation view of the support;

DETAILED DESCRIPTION OF PREFERRED EMBODIMENTS

Figure 1:
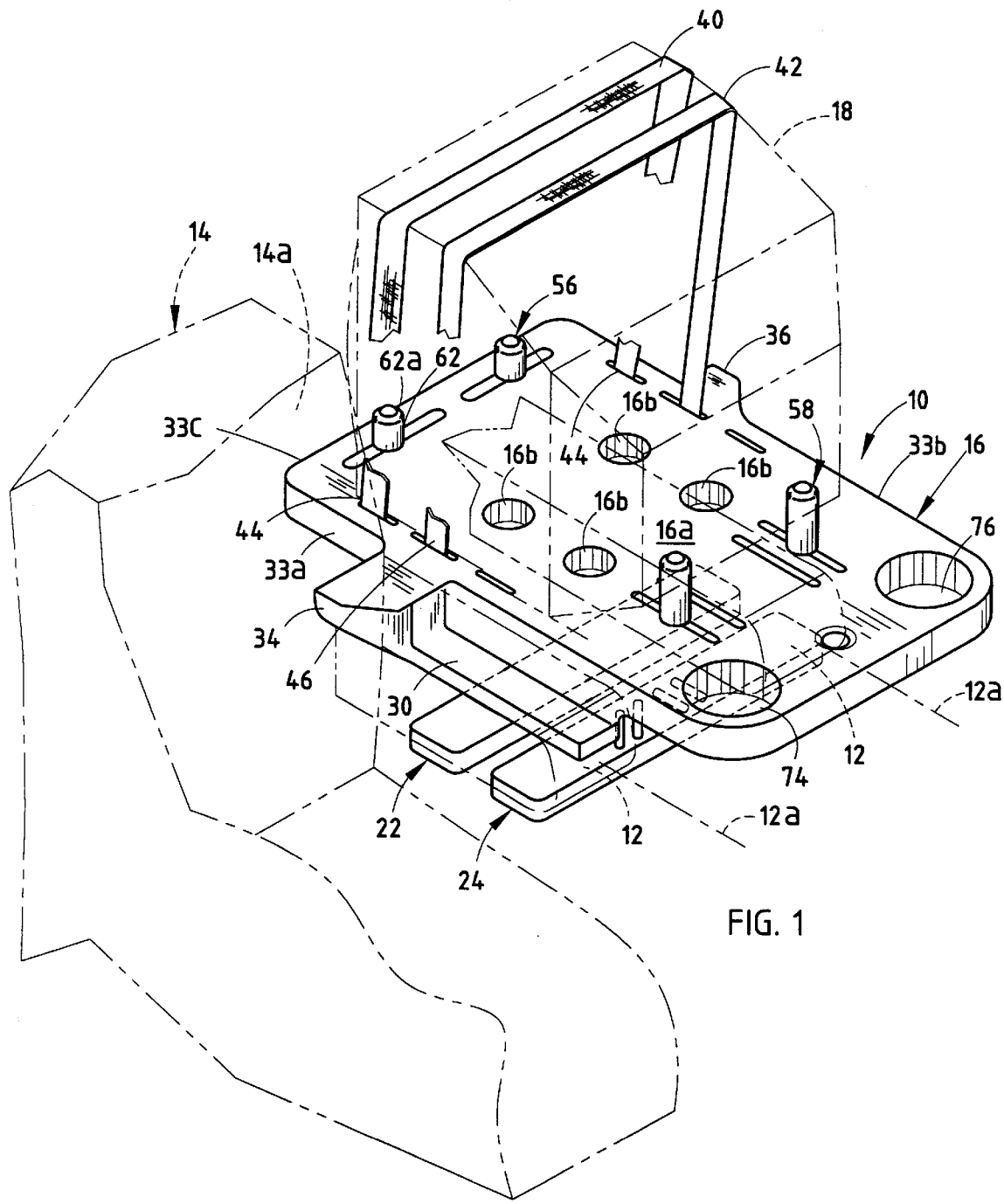
FIG. 1 is a perspective view of the support of the present invention mounted to a pair of arm rests.

Referring to FIG. 1, a support 10 of the present invention is illustrated mounted to a pair of spaced apart arm rests 12 of a pair of vehicle seats 14 (only one seat shown). Support 10 is preferably molded from a light weight but strong material, such as plastic, for example high density polyethylene, and can be easily handled and removed from arm rests 12 for storage. Support 10 includes a base 16 with a generally planar support surface 16a on which a piece of electronic equipment 18, for example a television or VCR or the like, is supported and is oriented towards the rear of the vehicle for viewing by the occupants of the rear of the vehicle.

Figure 3:
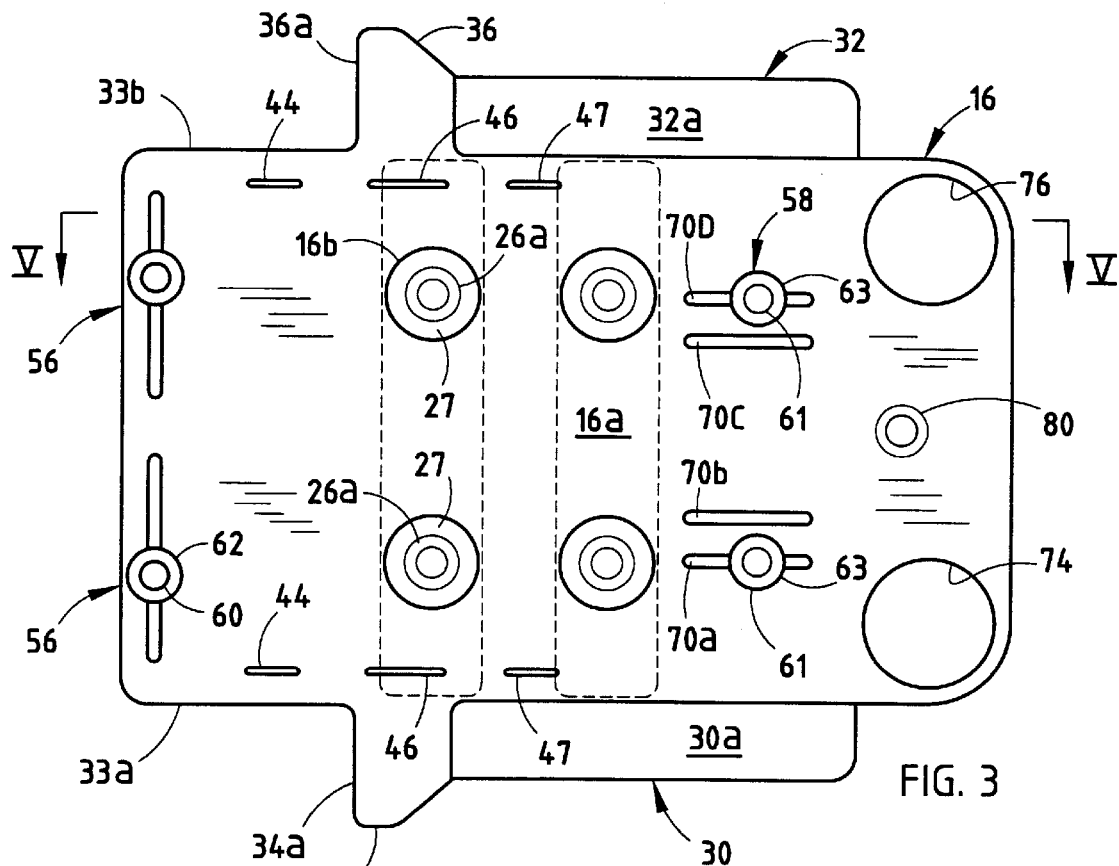
FIG. 3 is a top plan view of the support.

As best seen in FIG. 2, support 10 includes a pair of transverse members 22 and 24 which are secured to base 16 by a set of elongate adjustable connecting members 26, for example threaded rods. Adjustable connecting members 26 extend through respective openings 22a, 24a provided in transverse members 22 and 24 and through a plurality of openings 16b in base 16. Spacer members 26 preferably include enlarged ends 26a, which are seated in recessed shoulders 27 provided in openings 16b of base 16 so as not to project above support surface 16a of base 16 (FIG. 3). Transverse members 22 and 24 are movable along connecting members 26 and are positioned below arm rests 12 and secured in position by wing nuts 28, which are threaded onto the distal end portions 26b of connecting members 26. Transverse members 22 and 24, connecting members 26, and wing nuts 28 vertically restrain base 16 on arm rests 12 when the respective wing nuts 28 are tightened so that transverse members 22 and 24 together with base 16 clamp down on arm rests 12 to secure support 10 in place. Furthermore, when wing nuts 28 are tightened sufficiently to secure base 16 on arm rests 12, the frictional forces between base 16 and arm rest 12 provide a longitudinal restraint of support 10 on arm rests 12 along the respective longitudinal axes 12a of arm rests 12.

Base 16 also includes projecting flanges 30 and 32 which project outwardly from opposed sides 33a and 33b of base 16 and below support surface 16a. Flanges 30 and 32 include generally planar surfaces 30a and 32a, respectively, to provide arm rests for both the driver and occupant of the front seat in the vehicle. Flanges 30 and 32 also preferably include enlarged wedged members 34 and 36, respectively, which are positioned rearwardly of planar surfaces 30a and 32a and forwardly of rearward side 33c of base 16. Wedge members 34 and 36 form abutments for bearing against the seat backs 14a of seats 14. When support 10 is positioned on arm rests 12, wedged members 34 and 36 are positioned to press against seat backs 14a of seats 14. As best seen in FIG. 2a, wedged members 34 and 36 include a generally triangular side profile and define pivot points 34a, 36a which contact the seat backs 14a of seats 14 and are spaced above flanges 30 and 32 (only wedge 34 shown). Preferably, when support 10 is installed, support 10 is urged toward seats 14 so that wedge members 34 and 36 and, in particular, pivot points 34a and 36a of wedge members 34 and 36 at least slightly compress the surface of seat backs 14a. Support 10 is then subsequently tightened on arm rests 12 by transverse members 22 and 24. In addition to providing a lateral restraint for support 10, wedge members 34 and 36 in combination with transverse members 22 and 24 also provide a moment restraint for support 10 and, therefore, provide increased stability for support 10 when mounted to arm rests 12.

Figure 4:
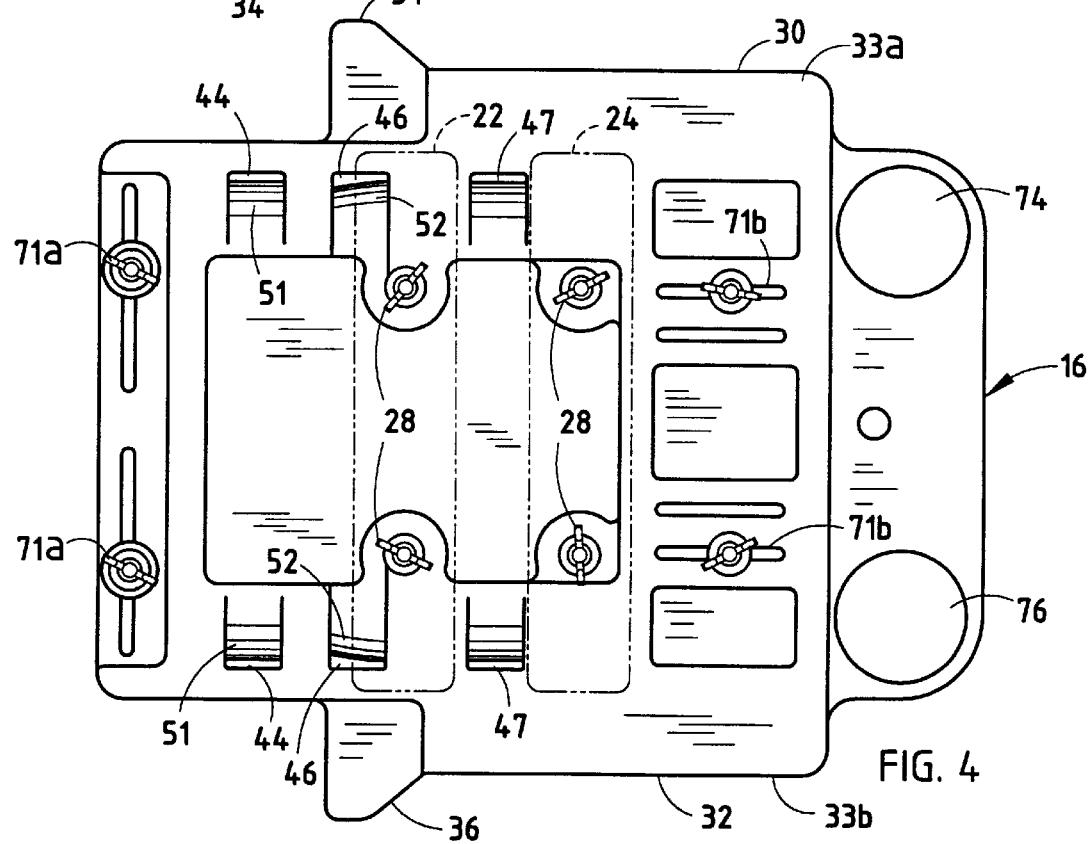
FIG. 4 is a bottom plan view of the support.
Figure 5:
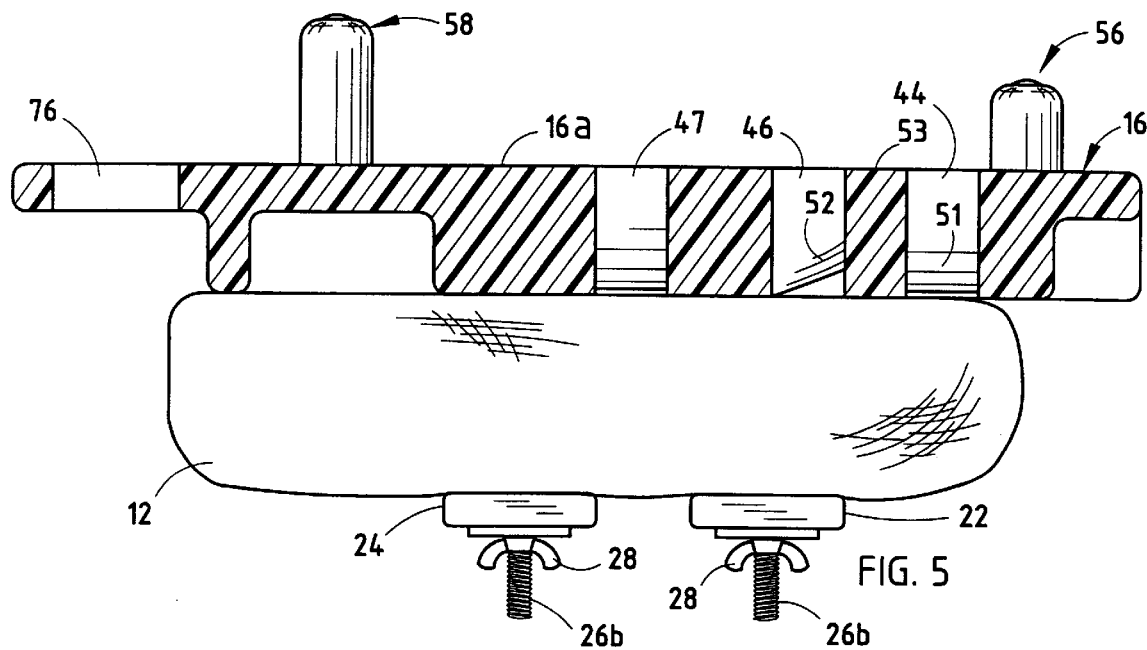
FIG. 5 is a cross-section view taken along the lines V—V of FIG. 3.
Figure 6:
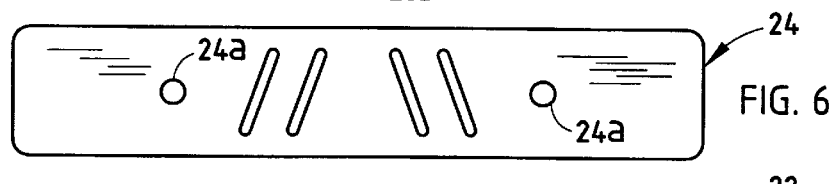
FIG. 6 is a top plan view of a cross member of a support assembly.
Figure 7:
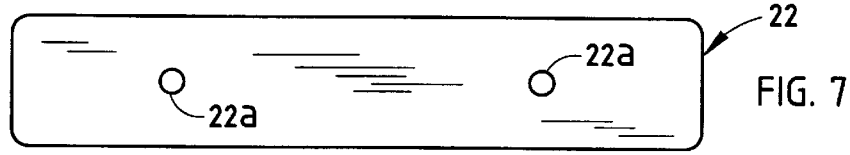
FIG. 7 is a top plan view of a second cross member.
Figure 8:
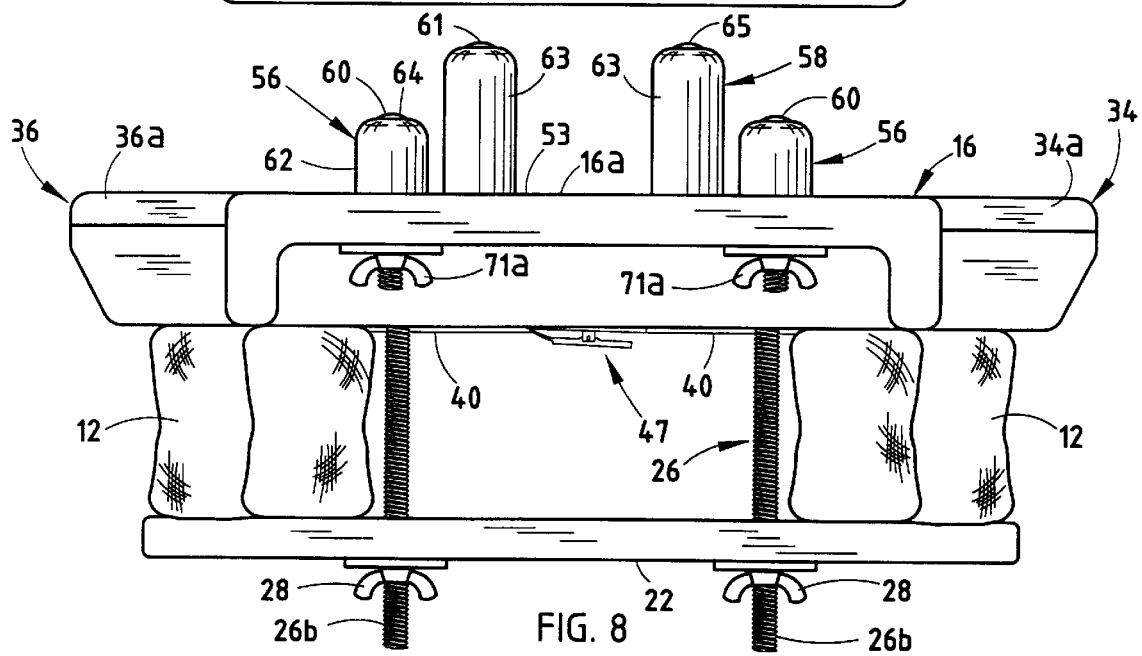
FIG. 8 is a front elevation view of the support mounted to a pair of spaced apart arm rests.

As best seen in FIG. 1, electronic equipment 18 is secured to base 16 by a pair of straps 40 and 42, for example woven or rubber straps, which vertically or downwardly restrain electronic equipment 18 on support 10. Straps 40 and 42 extend over the electronic equipment 18 and pass through corresponding slots 44 and 46 provided on either side of base 16 and are tightened by conventional buckles 47 which are positioned below of base 16 (FIG. 8). As best seen in FIGS. 4 and 5, slots 44 and 46 include arcuate bearing surfaces 51 and 52. Bearing surface 51 is curved around an axis that is generally parallel to the top surface 53 of base 16. Whereas bearing surface 52 is curved and tapered around an axis which is skewed with respect to top surface 53 or support surface 16a of base 16. Arcuate bearing surface 52 is angled or tapered to assure full contact between strap 42 and base 16 when strap 42 is skewed to accommodate the rearward sloping housing of electronic equipment 18. Where the electronic equipment does not include an angled housing, a third slot 47 is provided, which is similar to slot 44.

As best seen in FIG. 8, straps 40 and 42 are each secured and tightened by buckle 47, which is preferably positioned on the underside 16d of base 16 and between arm rests 12. Buckle 47 is preferably a quick release buckle of conventional construction. It should be understood that straps 40 and 42 may comprise other conventional straps than described above and, furthermore, may be secured by other conventional buckles or may be secured to structures provided on base 16, for example a ratcheting device or the like.

Electronic equipment 18 is laterally restrained on support 10 at least in part by straps 40 and 42 and, additionally, by a plurality of stops 56 and 58. Stops 56, 58 are preferably adjustable and generally comprise a bolt 60, 61 and bumper 62, 63, respectively. Each bolt 60, 61 extends through a respective transverse opening 62a, 63a of a respective bumper 62, 63 and through a respective transverse aperture or opening 68a, 68b, 70a, 70b, 70c, and 70d, provided in base 16. Each bolt 60, 61 preferably includes an enlarged head 64, 65 which fixes the position of the bolt in the respective bumper and secures the respective bumper 62, 63 to base 16. The position of each stop 56, 58 is fixed on base 16 by wing nuts 71a and 71b which are threaded onto the projecting ends of bolts 60, 61 and are tightened and torqued against a lower surface 72 of base 16. As best seen in FIGS. 1 and 2, aperture 68a and 68b are aligned along a common axis which is generally parallel to the rearward side 33c of base 16. On the other hand, apertures 70a–70d are spaced apart and aligned generally parallel with sides 33a and 33b of base 16. In order to provide adjustability of stops 56 and 58, openings 68a, 68b, 70a, 70b, 70c, and 70d are preferably slotted. Moreover, apertures 68a and 68b are slotted in a direction along their common axis which is generally orthogonal to the direction of slotted apertures 70a–70d. In this manner, when wing nuts 71a, 71b are loosened, stops 56 and 58 can be repositioned to accommodate equipment having different dimensions. For example, stops 56 provide adjustment for the width of electronic equipment 18, whereas stops 58 provide adjustment for the length of electronic equipment 18.

In the illustrated embodiment, bumpers 62 and 63 preferably comprise cylindrical members, for example plastic or rubber cylindrical tubes. Further, bumpers 63 generally extend above bumpers 62 since they are typically positioned at the back of the electronic equipment and, therefore, do not interfere with viewing side of the electronic equipment. Bumpers 62 are generally positioned on the viewing side of the equipment and, therefore, have a low height to allow an unobstructed view of the viewing face of the electronic equipment. It also should be understood that other stops or bumper configurations may be used without departing from the scope of this invention.

Optionally, base 16 includes a pair of drink or container holder openings 74 and 76 which are positioned on opposed sides 33a and 33b of base 16 and forward of support surface 16a to accommodate the driver and occupant of the front seat of the vehicle. Furthermore, base 16 may include a power cord access opening 80 near the forward side 33d of base 16. In this manner, when equipment 18 is plugged into electronic equipment 18 the risk of the cord becoming inadvertently unplugged or entangled with objects placed on support 10 is essentially eliminated.

Furthermore while one form of the invention has been shown and described, other forms will now be apparent to those skilled in the art. For instance, adjustable spacer members 26 may be formed from a threaded metal rod, a plastic threaded rod, or from a ratcheting device which preferably provides quick and easy adjustment of the position of transverse members 22 and 24 beneath arm rest 12. Moreover, other clamping devices for releasably securing base member 16 to arm rest 12 may be used, for example a single transverse member having a width commensurate in size with the two spaced apart transverse members can be used in lieu of the spaced apart transverse members 22 and 24. Furthermore, while the illustrated embodiment comprises a unitary member being formed from integral construction, for example by molding, base member 16 may be formed from an assembly of component parts, with each of the parts secured together using conventional methods, including welding or fastening. In addition, support 10 may be secured to fixed members other the arm rests of vehicle seats. The embodiment of the invention shown in the drawings is not intended to limit the scope of the invention which is defined by the claims which follow.

The embodiments of the present invention in which an exclusive property or privilege is claimed are defined as follows:

1. A support for securing entertainment equipment to a fixed member, the fixed member including a longitudinal extent and a vertical extent, said support comprising:

a base member having a support surface for supporting entertainment equipment thereon, the base member including adjustable restraint or at least vertically coupling said base member to the fixed member, a lateral restraint for restraining the lateral movement of said base member along the longitudinal extent of the fixed member, and a moment restraint for restraining said base member from overturning on the fixed member, said adjustable restraint including a transverse member for extending under the longitudinal extent of the fixed member and at least one connecting member adjustably and releasably securing said transverse member to said base member; and at least one restraining device for securing the entertainment equipment to said base member.

2. A support for securing entertainment equipment according to claim 1, wherein said connecting member comprises a threaded rod and a nut threadingly engaged with said threaded rod.

3. A support for securing entertainment equipment to a fixed member, the fixed member including a longitudinal extent and a vertical extent, said support comprising:

a base member having support surface for the entertainment equipment thereon, the base member including an adjustable restraint for at least vertically coupling said base member to the fixed member, a lateral restraint for restraining the lateral movement of said base member along longitudinal extent of the fixed member and a moment restraint for restraining said base member from overturning from the fixed member, said moment restraint comprising a pair of flanges, each of said flanges extending outwardly from an opposed side of said base member and being positioned for engaging the vertical extent of the fixed member; and at least one restraining device for securing the entertainment equipment to said base member.

4. A support for securing entertainment equipment according to claim 3, wherein each of said flanges includes a wedge member for abutting the vertical extent of the fixed member to provide a lateral restraint of said base member along the longitudinal extent of the fixed member and a moment restraint for restraining said base member from overturning on the fixed member.

5. A support for securing entertainment equipment to a pair of arm rests of adjacent seats, the arm rests including a generally horizontal supporting surface, and the seats providing generally vertical abutment surfaces, said support comprising:

a base member having a support surface for supporting the entertainment equipment thereon;

a transverse member being releasably and adjustably secured to said base member, said transverse member for extending under the generally horizontal support surface of the arm rests for restraining vertical movement of said base member with respect to the arm rests;

a pair of projecting members extending from opposed sides of said base member for positioning on the generally horizontal support surface of the arm rests and for abutting the vertical abutment surface of the adjacent seats to restrain lateral movement of said base member with respect to the arm rests and, in combination with said transverse member, restraining said base member from overturning on the arm rests; and at least one restraining device cooperating with said base member for securing the entertainment equipment to said base member.

6. A support for securing entertainment equipment according to claim 5, wherein said base member includes a plurality of adjustable stops for laterally restraining the entertainment equipment on said base member.

7. A support for securing entertainment equipment according to claim 6, wherein each of said adjustable stops includes a bumper, said bumpers being releasably and adjustably secured to said base member.

8. A support for securing entertainment equipment according to claim 7, wherein said base member includes a plurality of slotted openings, each of said bumpers being secured to said base member by a fastener, and said fasteners extending through respective slotted openings to permit adjustment of said bumpers on said base member.

9. A support for securing entertainment equipment according to claim 5, wherein said adjustable restraint comprises at least one strap.

10. A support for securing entertainment equipment according to claim 9, wherein said adjustable restraint comprises first and second straps, said first and second straps extending through first and second slots, respectively, provided in said base member, said first opening including an arcuate bearing surface, said arcuate bearing surface being skewed with respect to said support surface whereby said first strap maintains full contact with said base member when said first strap is skewed with respect to said support surface.

11. A support for securing entertainment equipment according to claim 5, wherein said base includes at least one opening, said opening being configured for holding one of a cup and a container.

12. A support for entertainment equipment comprising:
a base having a forward end, a rearward end, opposed sides, and a support surface for supporting the entertainment equipment thereon, said base including a pair of outwardly extending flanges on said opposed sides of said base and a plurality of adjustable stops for restraining lateral movement of the entertainment equipment on said support surface of said base;
an adjustable clamp secured to said base for securing said base to a fixed support; and
a releasable equipment restraint coupled to said base for securing the entertainment equipment to said base on said support surface between said stops.

13. A support according to claim 12, wherein each of said outwardly extending flanges are recessed below said support surface of said base, said flanges providing arm rests.

14. A support according to claim 13, wherein said flanges include a pair of wedge members extending outwardly from said base and rearwardly of said arm rests of said flanges, said wedge members including portions spaced above said arm rests for engaging vertical portions of the fixed member to stabilize said support on the fixed member.

15. A support according to claim 14, wherein said wedge members are integrally formed with said base and said flanges.

16. A support according to claim 14, wherein said wedge members include an upper surface generally flush with said support surface of said base.

17. A support according to claim 12, wherein said adjustable clamp comprises at least one transverse member and a pair of spaced apart adjustable connecting members, said transverse member movable mounted on said connecting members, said connecting members fixing the position of said transverse member with respect to said base, and said transverse member for being positioned on an opposed side of the fixed member from said base whereby said connecting members clamp said base on the fixed member.

18. A support according to claim 17, wherein each of said connecting members comprises a threaded rod and a nut, said nut being threadingly engaged with said rod and for clamping said transverse member and said base on the fixed member.

19. A support according to claim 12, wherein said base includes at least one aperture extending therethrough, said aperture being adapted to support one of a cup or a container therein.

20. A support according to claim 12, wherein at least said base comprises a plastic base.

* * * * *

UNITED STATES PATENT AND TRADEMARK OFFICE
CERTIFICATE OF CORRECTION

PATENT NO. : 5,839,713
DATED : November 24, 1998
INVENTOR(S) : Carroll Wright

It is certified that error appears in the above-identified patent and that said Letters Patent is hereby corrected as shown below:

Column 6, claim 3, line 16:
 "support surface for" should be --a support surface for supporting--.

Column 6, claim 3, line 21:
 "along" should be --along the--.

Signed and Sealed this

Twenty-first Day of December, 1999

Attest:

Q. TODD DICKINSON

*Attesting Officer*    *Acting Commissioner of Patents and Trademarks*